(12) United States Patent
Snell et al.

(10) Patent No.: US 6,622,605 B1
(45) Date of Patent: Sep. 23, 2003

(54) FAIL SAFE ARMING UNIT MECHANISM

(75) Inventors: Marcus Snell, Greenwood, IN (US); Randall Pahl, Indianapolis, IN (US)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 09/774,483

(22) Filed: Jan. 30, 2001

(51) Int. Cl.$^7$ ............................... B64D 1/04; F41F 5/00
(52) U.S. Cl. ........................................ 89/1.55; 294/82.33
(58) Field of Search ...................... 89/1.55; 294/82.33

(56) References Cited

U.S. PATENT DOCUMENTS

| | | | | |
|---|---|---|---|---|
| 2,922,340 A | * | 1/1960 | Wilkie | 24/603 |
| 3,285,132 A | * | 11/1966 | McCurdy | 89/1.51 |
| 3,807,784 A | * | 4/1974 | Laky | 294/82.33 |
| 3,831,486 A | * | 8/1974 | Yost | 24/603 |
| 3,945,295 A | * | 3/1976 | Robison | 269/8 |
| 4,179,150 A | * | 12/1979 | Conrad et al. | 294/82.3 |
| 4,407,180 A | * | 10/1983 | Regnat | 89/1.53 |
| 4,754,686 A | * | 7/1988 | Guitaut et al. | 294/82.33 |
| 4,987,820 A | * | 1/1991 | Gordon | 294/82.26 |
| 5,052,271 A | * | 10/1991 | West | 89/1.55 |
| 5,305,676 A | * | 4/1994 | Conrad et al. | 294/82.32 |

FOREIGN PATENT DOCUMENTS

DE      3117617 A1 * 5/1981

* cited by examiner

Primary Examiner—Peter M. Poon
Assistant Examiner—Troy Chambers
(74) Attorney, Agent, or Firm—William C. Schubert; Glenn H. Lenzen, Jr.

(57) ABSTRACT

A zero retention force arming apparatus and method used in conjunction with bomb racks, aircraft pylon, or other weapons release systems that use weapons which are armed by the pulling of a lanyard that provides for fail safe operation. The apparatus and method provides an arming unit which releases armed weapons with zero retention force; and it which releases unarmed weapons even in the event of a release system failure.

10 Claims, 6 Drawing Sheets

FAIL SAFE ARMING UNIT MECHANISM

BACKGROUND OF THE INVENTION

1. Field of the Invention

This invention relates to an arming unit retention mechanism and methods of use thereof. The invention hybridizes conventional arming unit technology with zero retention force arming unit technology to provide an arming unit which releases armed weapons with zero retention force and which releases unarmed weapons even in the event of a release system failure.

2. Description of the Related Art

Arming unit retention mechanisms are used in conjunction with bomb racks, aircraft pylon, or other weapons release systems that use weapons which are armed by the pulling of a lanyard. In these arming unit systems, a hook retains the weapon lanyard such that when the weapon is released, the lanyard is pulled, and the weapon is armed by the pulling of the lanyard. Additionally, at times it is desired to release an unarmed weapon. These arming unit systems permit the plunger or hook to be disengaged from the weapon lanyard such that when the weapon is released, the lanyard is not pulled, and the weapon is released unarmed. Exemplary weapons release systems that use such arming units include the BRU-36 bomb rack, used on the AV-8 aircraft, and the BRU-32/33 bomb racks used on the F-18 aircraft.

Two types of arming unit (hereinafter "AU") retention mechanisms are commonly known in the art, conventional AU technology and zero retention force (hereinafter "ZRF") AU technology.

As described above, at times it is desired to release an unarmed weapon. In conventional AU mechanisms, in order to release an unarmed weapon the user must provide the force necessary (typically 10–12 pounds of force) to disengage the hook from the lanyard. If the user is unable to provide this force, or if the mechanism fails for whatever reason, the AU does not open and an armed weapon is released instead of the desired unarmed weapon.

In ZRF AU mechanisms, the lanyard is disengaged by the driving of a mechanical linkage for opening the lanyard hook. If this mechanism fails for whatever reason, the ZRF AU does not open and an armed weapon is released instead of the desired unarmed weapon.

Neither the conventional AU or the ZRF AU allows zero retention and a fail safe mode of release if the mechanism fails. Furthermore, in the event of inadvertent weapon release resulting from mechanical failure of the bomb rack, the current arming units would retain the lanyard and release an armed weapon. Therefore, there is a continuing need for a zero retention release of unarmed weapons that provides a fail safe in the event of mechanism failure.

Additionally, the current equipment in the field is equipped with either one of the two above mentioned systems. Accordingly, there is a continuing need for a zero retention force release of unarmed weapons that provides a fail safe in the event of mechanism failure, and which can be retrofitted to the existing equipment.

SUMMARY OF THE INVENTION

The apparatus and method of the present invention relies on a mechanical force acting on a lanyard hook to provide zero retention force disengagement of the lanyard from the hook when the apparatus is in an Open mode. However, in the event this system fails, the lanyard hook of the present invention still releases the lanyard by using the weight of the weapon as the force to open the hook when the apparatus is in either the Open or Normal modes. The lanyard hook of the apparatus locks closed only when the apparatus is in a Locked mode.

DESCRIPTION OF PREFEIRRED EMBODIMENT

The fail safe arming unit mechanism 5 of the present invention is seen in FIGS. 1 through 6. Arming unit 5 operates in three modes: Normal mode, Armed/Locked mode (hereinafter "Locked Mode") and Open mode, as described herein.

Figure 1:
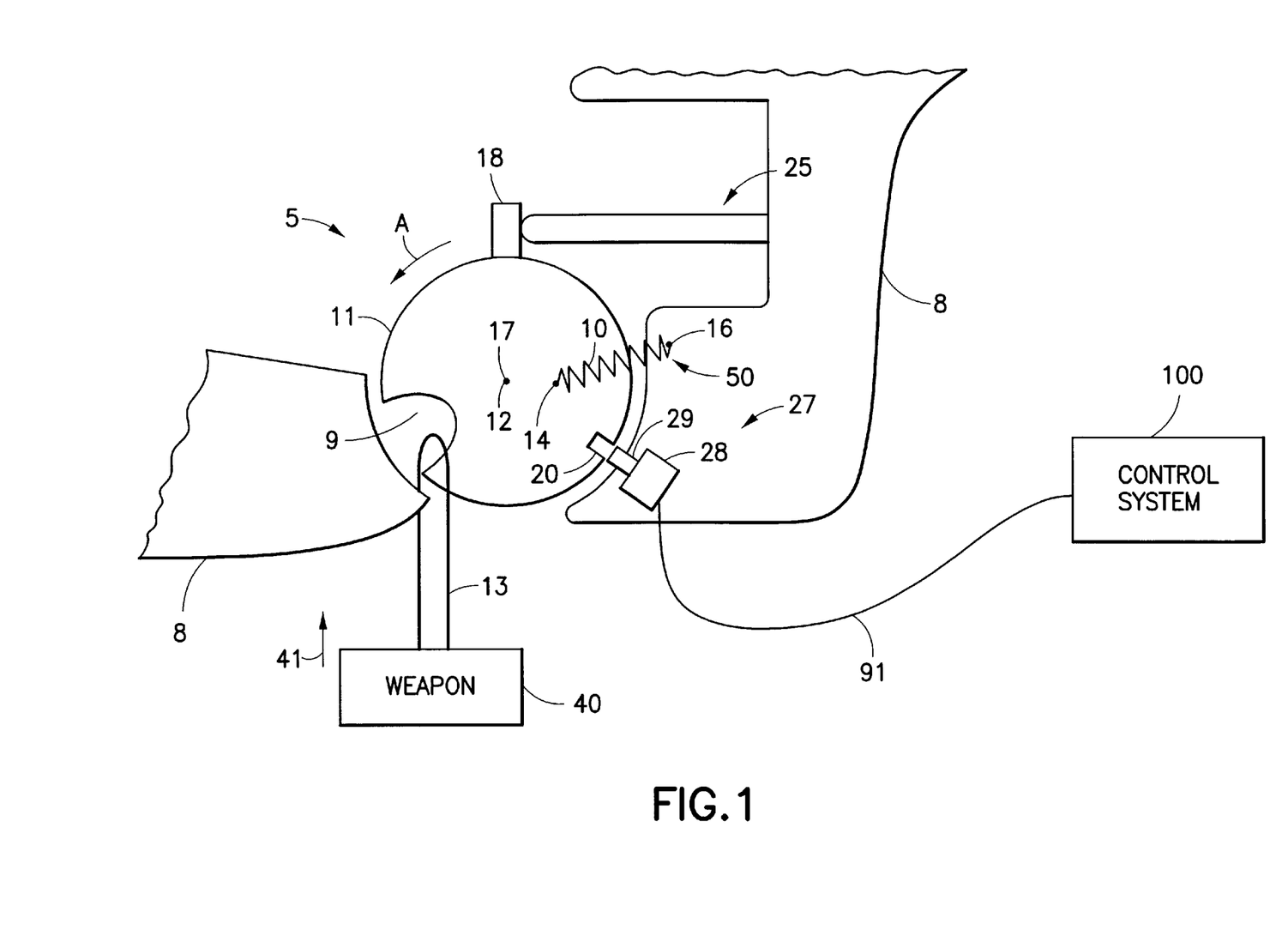
FIG. 1 is a side view of the fail safe arming unit mechanism of the present invention retrofitted to an existing aircraft.

In a first embodiment, shown in FIG. 1, arming unit mechanism 5 is retrofitted to an existing aircraft. The Locked mode and Open Mode are determined and delivered to arming unit 5 from the existing aircraft's control system 100. In this instance, control system 100 switches arming unit mechanism 5 into one of the modes. Alternately, Normal mode is a default mode when arming unit 5 is not receiving any switching signals from control system 100.

Figure 2:
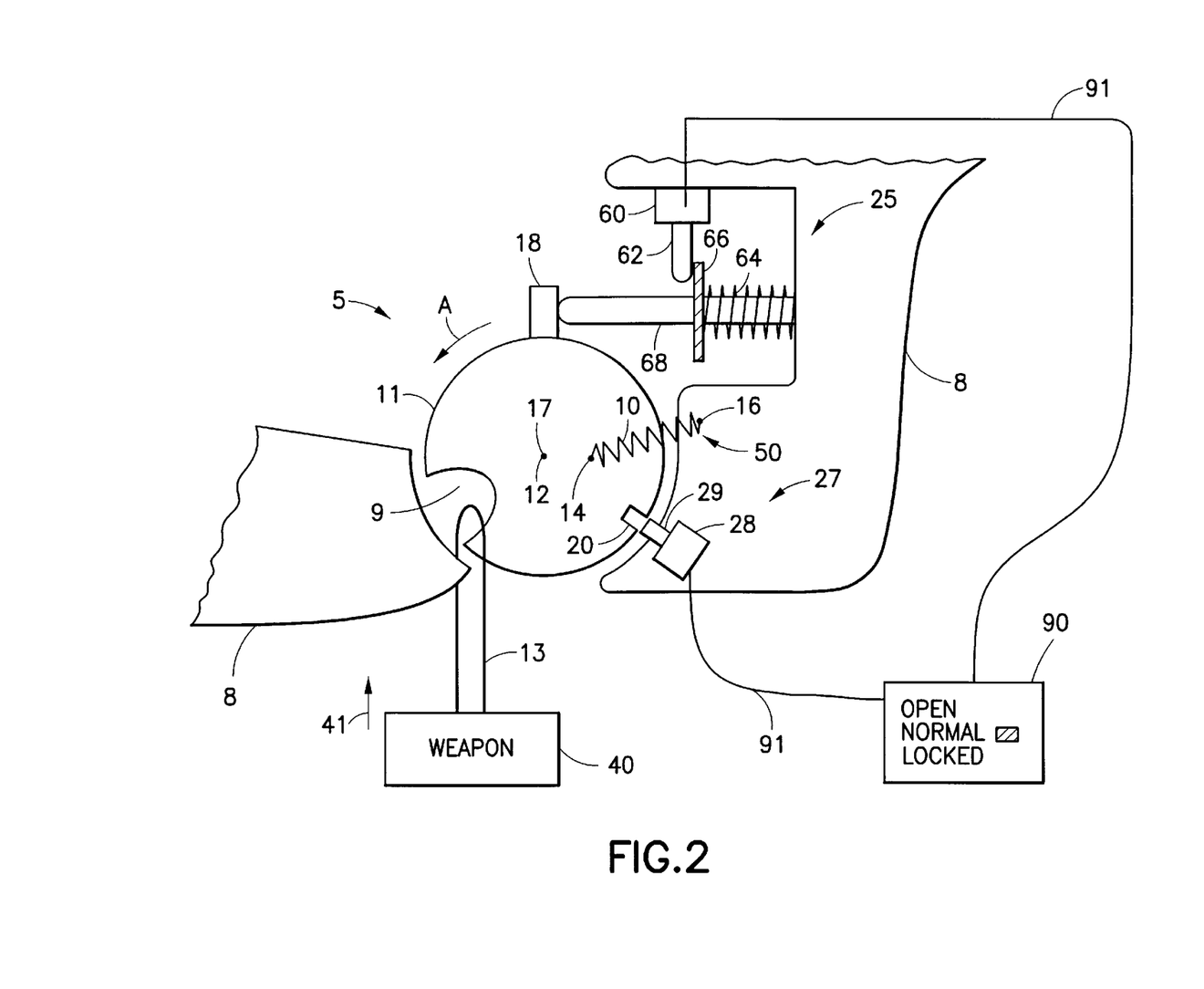
FIG. 2 is a side view of the fail safe arming unit mechanism of the present invention in the Normal mode.

In an alternate embodiment, shown in Figure, the user switches to the desired mode via switch 90, which may be a manual switch or an automatic switch, such as, but not limited to, a multiple position manually driven or electrically driven switch. In this instance, switch 90 switches arming unit mechanism 5 into one of the modes.

Arming unit 5 uses a substantially circular lanyard hook 11 with a lanyard opening 9 to engage an arming lanyard 13 of a weapon 40 between lanyard opening 9 and a weapon holding base 8 of the aircraft (not shown). Hook 11 is considered to be in a closed position when lanyard opening 9 is covered by base 8 (as shown in FIGS. 1 and 2) and in an open position when lanyard opening 9 is not covered by base 8 (as shown in FIG. 3).

A hook closing unit 50 is disposed between hook 11 and base 8. In the preferred embodiment, closing unit 50 includes a spring 10, preferably a compression spring, disposed between a movable anchor point 14 disposed on hook 11 and a stationary anchor point 16 disposed on base 8. In the preferred embodiment, hook 11 has an axis of rotation through point 12 at the center 17 of the hook. A movable anchor point 14 at a point offset from center 17 that moves with hook 11 and a locking indent 20 are also provided on the hook. When hook 11 is rotated about point 12 such that movable anchor point 14 is above point 12, spring 10 urges hook 11 into a closed position. Similarly, when hook 11 is rotated about point 12 such that movable anchor point 14 is below point 12, spring 10 urges hook 11 into a closed position. Thus, the Normal mode of arming unit 5 is achieved by closing unit 50 maintaining hook 11 in a closed position. Alternate embodiments of closing unit 50 include a ball/detent mechanism 51 and a roller/cam mechanism 52 shown in FIGS. 5 and 6, respectively.

When operating in the Normal mode, shown in FIGS. 1 and 2, arming unit 5 permits release of an unarmed weapon 40. As described above, lanyard 13 acts to arm weapon 40 when pulled with an arming force, shown generally as the arrow 41. If weapon 40 is released with the arming unit 5 operating in the Normal mode, the weight of weapon 40 when released is sufficient to rotate hook 11 from the closed position (FIGS. 1 and 2) maintained by closing unit 50 into the open position (FIG. 3). Thus, an unarmed weapon 40 is released. For example, if one assumes that 12 pounds of force 41 are required to pull lanyard 13 to arm weapon 40, then the force exerted by the weight of weapon 40 on closing unit 50 (e.g. on spring 10) will be sufficient to rotate lanyard hook 11 to the open position without exceeding the 12 pounds of force 41 necessary to pull lanyard 13. Since closing unit 50 is operative in both the Open mode and the Normal mode, closing unit 50 permits arming unit 5 to act as a fail safe arming unit in the event of a failure during the Open mode as described below.

Figure 3:
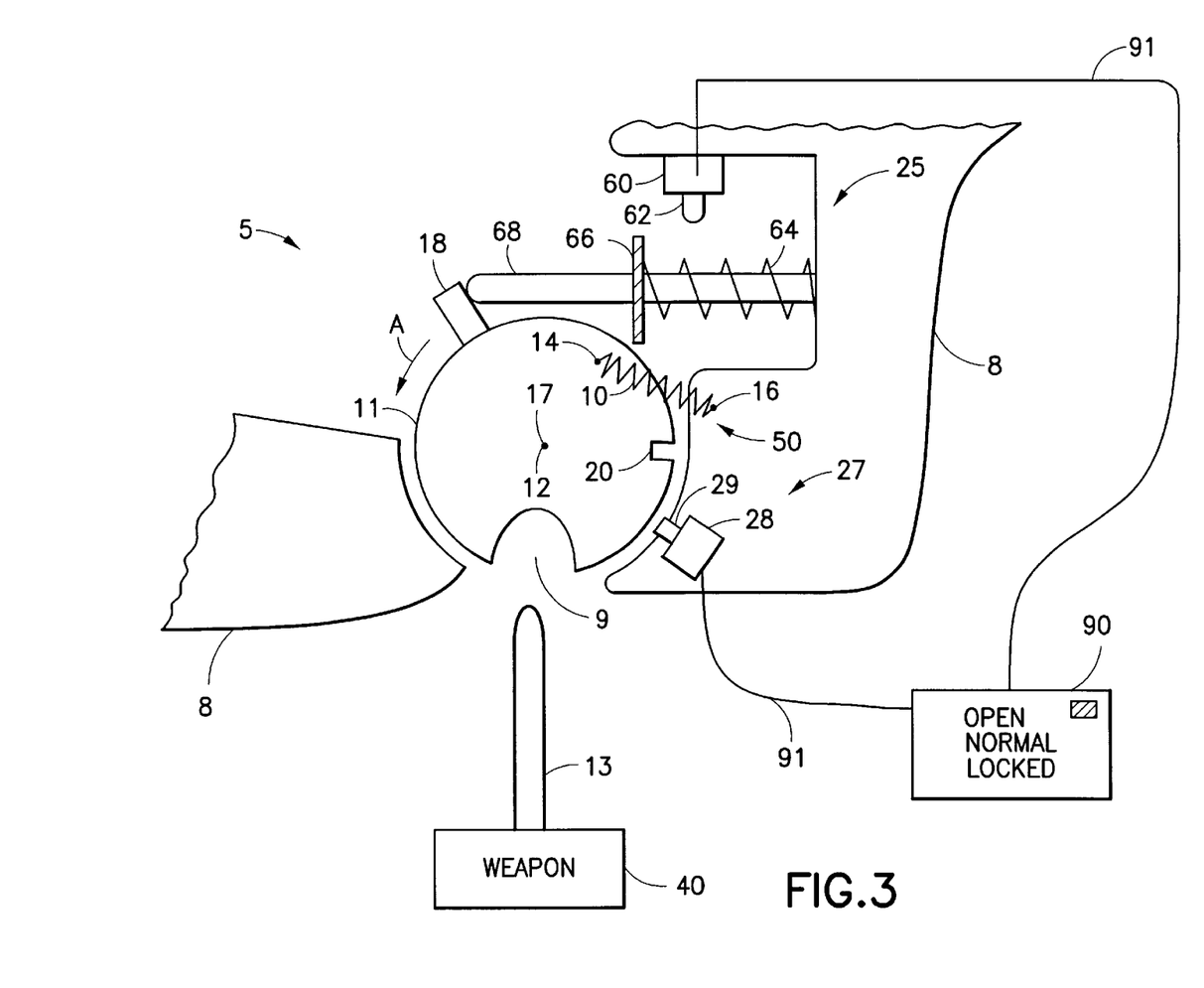
FIG. 3 is a side view of the fail safe arming unit mechanism of the present invention in the Open mode.

When operating in the Open mode, shown in FIG. 3, arming unit 5 also permits release of an unarmed weapon. During the Open mode, hook 11 is rotated about point 12 until lanyard opening 9 is not covered by base 8, permitting lanyard 13 of a released weapon 40 to not be pulled. In order to achieve the Open mode, the user activates urging unit 25 of base 8.

As described above, control system 100 switches to the Open mode or the user uses switch 90 to switch to the Open mode. In the Open mode, urging unit 25 acts upon hook 11 to urge the hook to rotate about point 12 into the open position. Urging unit 25 generates sufficient force to rotate hook 11 in the direction shown by arrow A from the normally closed position maintained by closing unit 50.

In an first embodiment, urging unit 25 includes the force provided by conventional AU mechanisms. Alternately, urging unit 25 includes the mechanical linkage force provided by ZRF AU mechanisms. In this embodiment, urging unit 25 is part of the existing aircraft, thus allowing arming unit 5 to be easily retrofitted to current aircraft. The Open mode causes urging unit 25 to act upon a linkage tab 18 that is disposed upon hook 11. Thus, the force of urging unit 25 upon linkage tab 18 rotates hook 11 about point 12 in the direction shown by arrow A.

In an alternate embodiment, urging unit 25 is added to base 8 of the existing aircraft, which also allows arming unit 5 to be easily retrofitted to current aircraft. Urging unit 25 disposed on base 8 and includes a solenoid 60 with a retracting pin 62, a compression spring 64, a locking tab 66 and an urging pin 68 which acts upon a linkage tab 18 that is disposed upon hook 11. The user activates urging unit 25 by switching to the Open mode. Activating urging unit 25 causes solenoid 60 to retract retracting pin 62. Retracting pin 62 normally provides a force on locking tab 66 to maintain compression spring 64 in a compressed state. The retraction of retracting pin 62 by solenoid 60 removes the compressive force acting upon locking tab 66. Thus, the force within compression spring 64 acts upon locking tab 66 to urge pin 68 towards linkage tab 18, thus rotating hook 11 about point 12 in the direction shown by arrow A. It should be understood that urging unit 25 encompasses any source capable of generating a force capable of rotating hook 11 about point 12 in the direction shown by arrow A, whether by acting on tab 18 or directly on hook 11.

Figure 4:
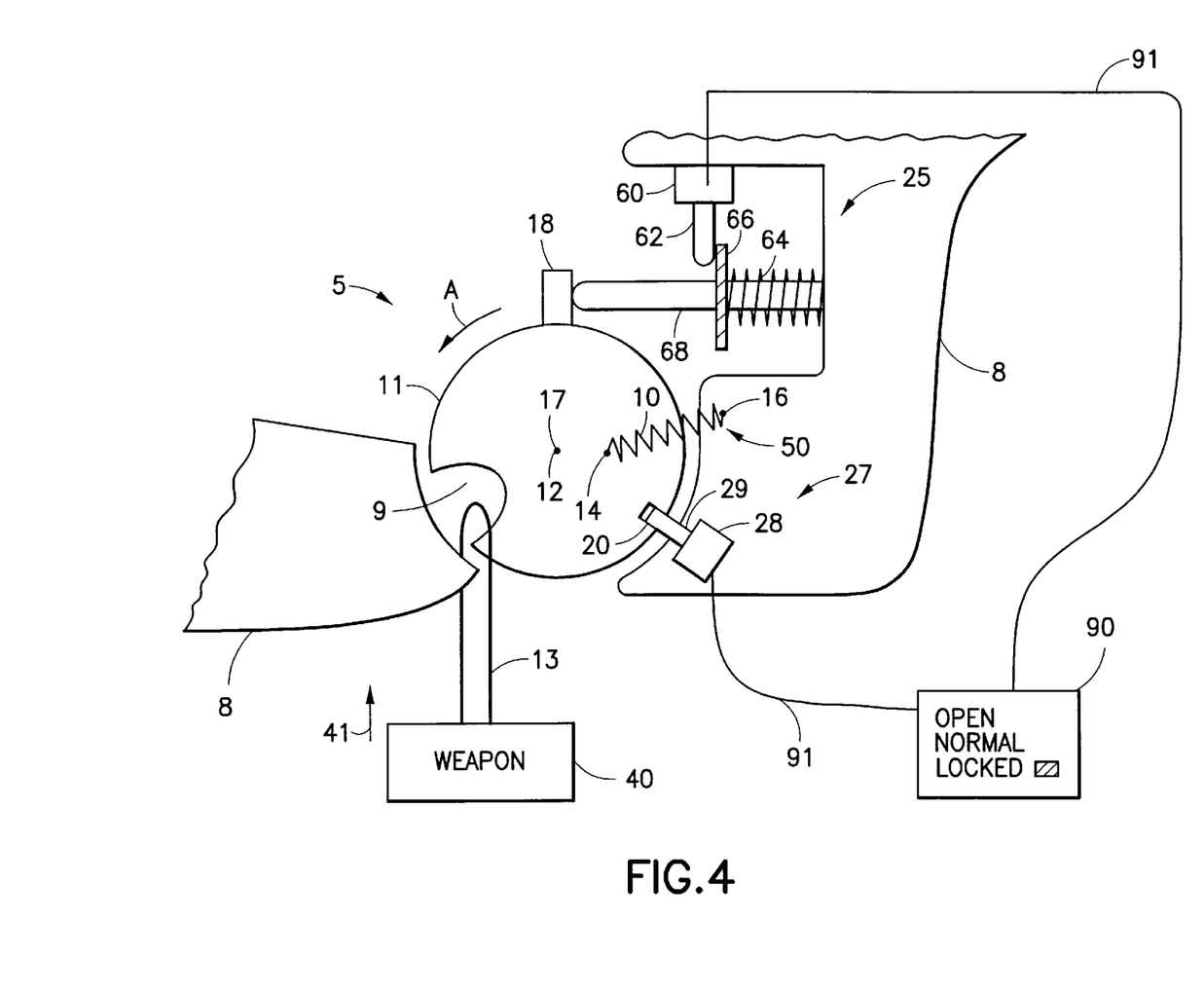
FIG. 4 is a side view of the fail safe arming unit mechanism of the present invention in the Locked mode.
Figure 5:
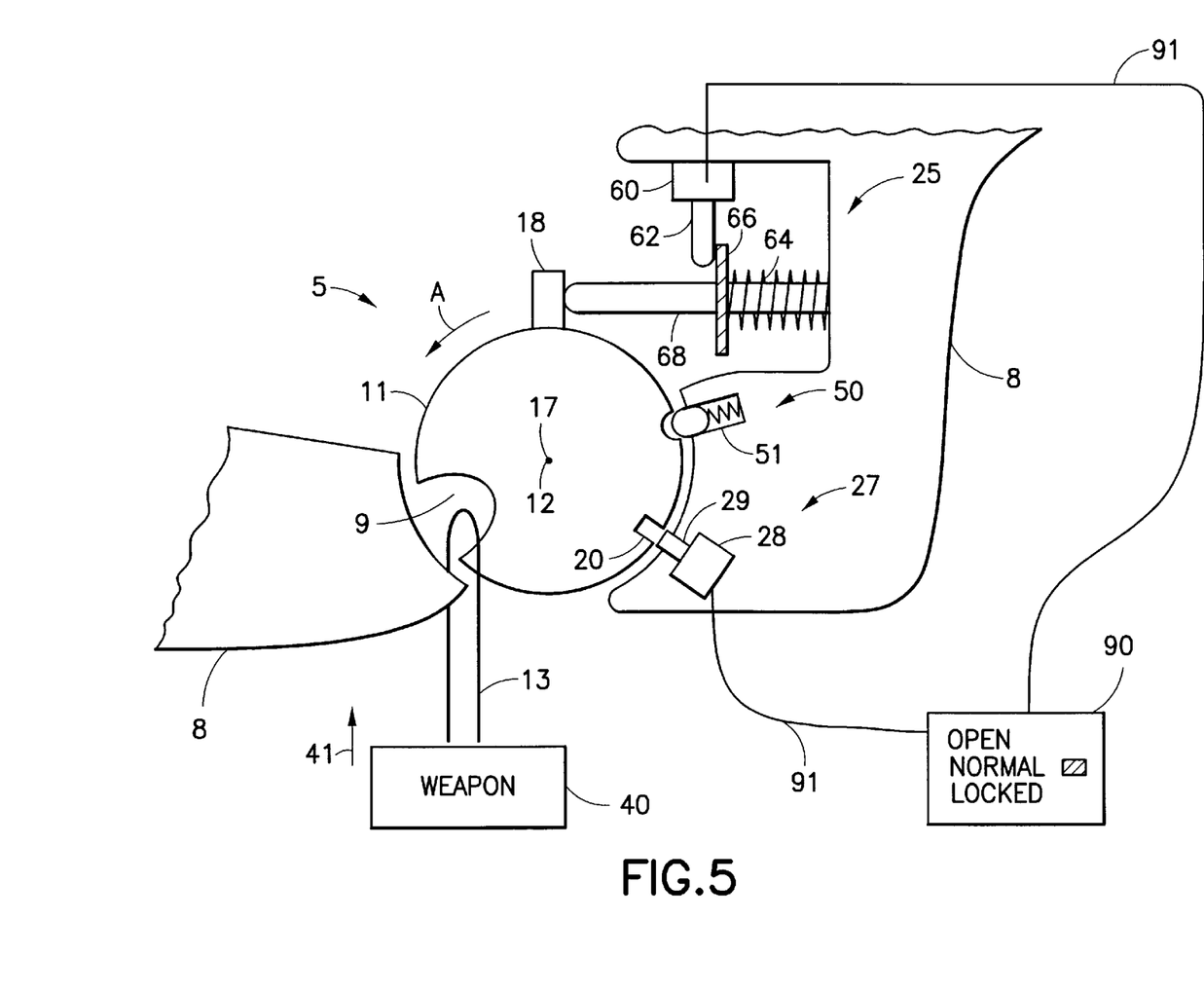
FIG. 5 is a side view of the closing unit of the present invention with a ball/detent mechanism.
Figure 6:
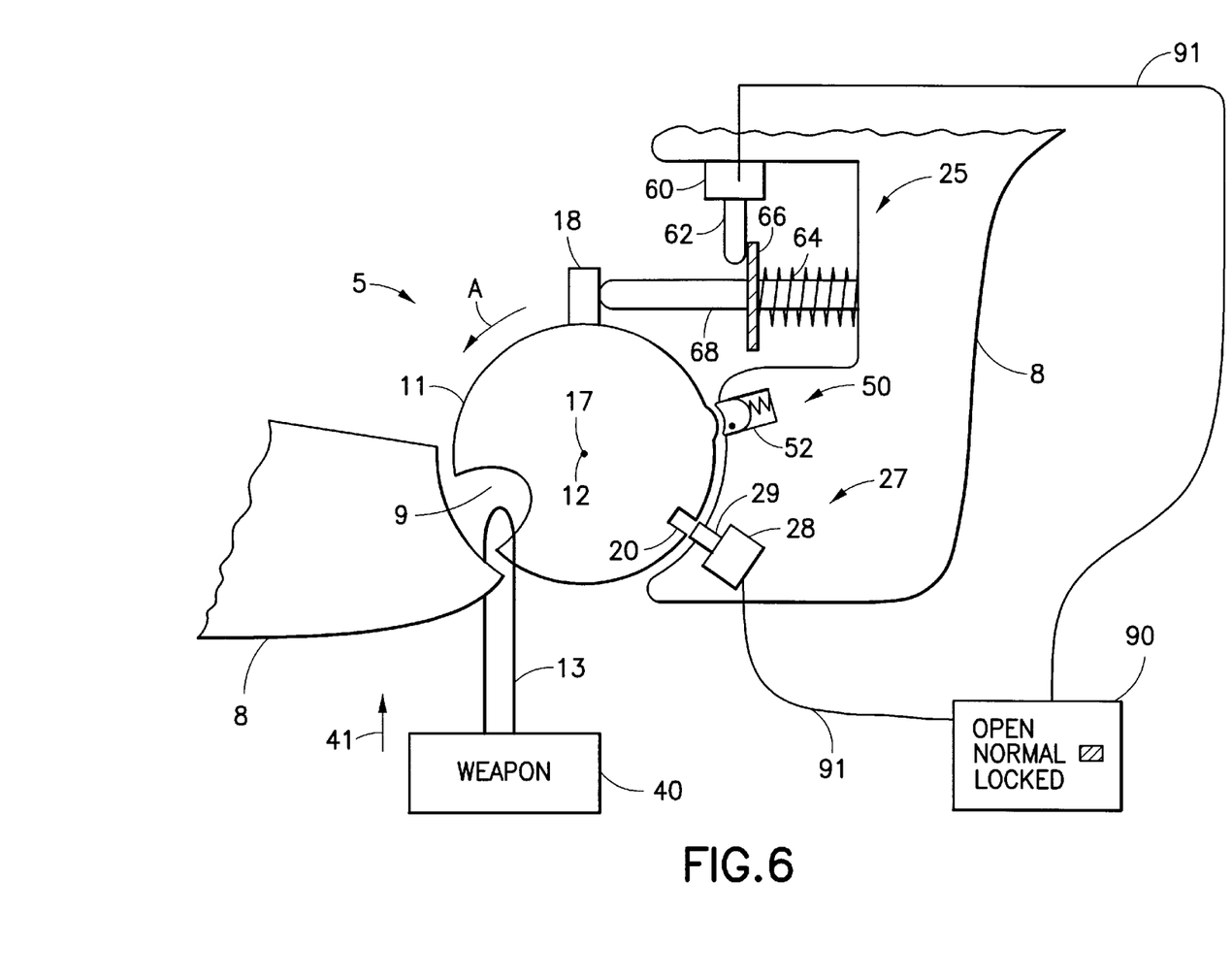
FIG. 6 is a side view of the closing unit of the present invention with a roller/cam mechanism.

When operating in the Locked mode, shown in FIG. 4, arming unit 5 permits release of an armed weapon. During the Locked mode, hook 11 is locked into the normally closed position, permitting lanyard 13 that is engaged within lanyard opening 9 to be pulled by the weight of the released weapon. The user activates locking unit 27 that is disposed upon base 8 by switching to the Locked mode. Locking unit 27 engages with hook 11 to prevent the hook from rotating about point 12 into the open position. In the preferred embodiment, locking unit 27 is a solenoid 28 adapted to extend a locking pin 29 into a locking indent 20 disposed on hook 11, when arming mechanism 5 is in the Locked mode, and is adapted to retract locking pin 29 from locking indent 20 when arming mechanism 5 is in the Normal and Open modes.

In the embodiment where the Locked mode and Open Mode are switched to by control system 100, the control system is coupled to solenoid 28 via standard electrical connections 91, as shown in FIG. 1. Similarly, in the embodiment where the modes are switched to via switch 90, the switch is coupled to solenoid 60 and solenoid 28 via standard electrical connections 91, as shown in FIG. 2.

It should be understood that the foregoing description is only illustrative of the present invention. Various alternatives and modifications can be devised by those skilled in the art without departing from the invention. Accordingly, the present invention is intended to embrace all such alternatives, modifications and variances which fall within the scope of the appended claims.

What is claimed is:

1. An apparatus for arming weapons secured to a weapon base of an aircraft wherein the weapons are armed by pulling a lanyard with an arming force upon release of the weapon from the weapon base, comprising:

a single hook having a substantially circular shape with a lanyard opening for engaging the lanyard, said hook being rotatable such that said lanyard opening is closed engaging the lanyard and is rotatable such that said lanyard opening is open disengaging the lanyard, the circular shaped hook having an outer perimeter and a locking indent on the outer perimeter;

closing means providing a force for maintaining said lanyard opening closed, said force being less than the arming force of the weapon; and a locking unit to lock the hook closed, the locking unit comprising a solenoid and a locking pin which is movable by the solenoid into and out of the locking indent on the outer perimeter of the circular shaped hook.

2. An apparatus for arming weapons secured to a weapon base of an aircraft wherein the weapons are armed by pulling a lanyard with an arming force upon release of the weapon from the weapon base, comprising:

a hook having a lanyard opening for engaging the lanyard, said hook being rotatable such that said lanyard opening is closed engaging the lanyard and is rotatable such that said lanyard opening is open disengaging the lanyard; and closing meant providing a force for maintaining said lanyard opening closed, said force being less than the arming force of the weapon, wherein said closing means comprises:

a stationary anchor point disposed on the base;
a movable anchor point disposed on said hook at a point offset from a center of said hook; and spring means disposed between said movable anchor and said stationary anchor providing said force for maintaining said hook closed.

3. The apparatus of claim 2, wherein said spring means comprises a compression spring.

4. An apparatus for arming weapons secured to a weapon base of an aircraft wherein the weapons are armed by pulling a lanyard with an arming force upon release of the weapon from the weapon base, comprising:

a hook having a lanyard opening for engaging the lanyard, said hook being rotatable such that said lanyard opening is closed engaging the lanyard and is rotatable such that said lanyard opening is open disengaging the lanyard;

closing means providing a force for maintaining said lanyard opening closed, said force being less than the arming force of the weapon; and switching means for switching to one of an open mode, a normal mode, or a locked mode.

5. The apparatus of claim 4, wherein said switching means comprises a switch for switching to one of said open, normal, or locked modes.

6. The apparatus of claim 4, wherein said closing means maintains said lanyard opening closed upon switching to said normal mode.

7. The apparatus of claim 4, further comprising a locking unit to lock said hook closed upon switching to said locked mode.

8. The apparatus of claim 4, further comprising an urging unit to open said hook upon switching to said open mode.

9. An apparatus for arming weapons secured to a weapon base of an aircraft wherein the weapons are armed by pulling a lanyard with an arming force upon release of the weapon from the weapon base, comprising;

a hook having a lanyard opening for engaging the lanyard, said hook being rotatable such that said lanyard opening is closed engaging the lanyard and is rotatable such-that said lanyard opening is open disengaging the lanyard; and closing means providing a force for maintaining said lanyard opening closed, said force being less than the arming force of the weapon;

the apparatus further comprising an urging unit comprising:

a solenoid having a retracting pin, a compression spring, a locking tab and an urging pin disposed upon the base;

said retracting pin provides a restraining force on said locking tab to maintain said compression spring in a compressed state; and said solenoid retracts said retracting pin removing the restraining force acting upon said locking tab such that said compression spring acts upon said locking tab to said urging pin in contact with a linkage tab disposed upon said hook to rotate said hook open.

10. An apparatus for arming weapons secured to a weapon base of an aircraft wherein the weapons are armed by pulling a lanyard with an arming force upon release of the weapon from the weapon base, comprising:

a hook having a lanyard opening for engaging the lanyard, said hook being rotatable such that said lanyard opening is closed engaging the lanyard and is rotatable such that said lanyard opening is open disengaging the lanyard; and closing means providing a force for maintaining said lanyard opening closed, said force being less than the arming force of the weapon, wherein the aircraft has an urging unit for acting on a linkage tab disposed upon said hook to rotate said hook open.

* * * * *

UNITED STATES PATENT AND TRADEMARK OFFICE
CERTIFICATE OF CORRECTION

PATENT NO. : 6,622,605 B1
DATED : September 23, 2003
INVENTOR(S) : Marcus Snell and Randall Pahl It is certified that error appears in the above-identified patent and that said Letters Patent is hereby corrected as shown below:

<u>Column 1,</u>
Line 3, insert the following:
-- This invention was made with Government support under contract No. N00019-96-D-0159 awarded by the Department of the Navy. The Government has certain rights in this invention. --

Signed and Sealed this

Thirtieth Day of December, 2003

JAMES E. ROGAN
*Director of the United States Patent and Trademark Office*